June 5, 1951 L. HARRISON 2,555,643
FRICTION GEARING FOR TELEGRAPHONE MECHANISM
Filed Dec. 11, 1947 5 Sheets-Sheet 1
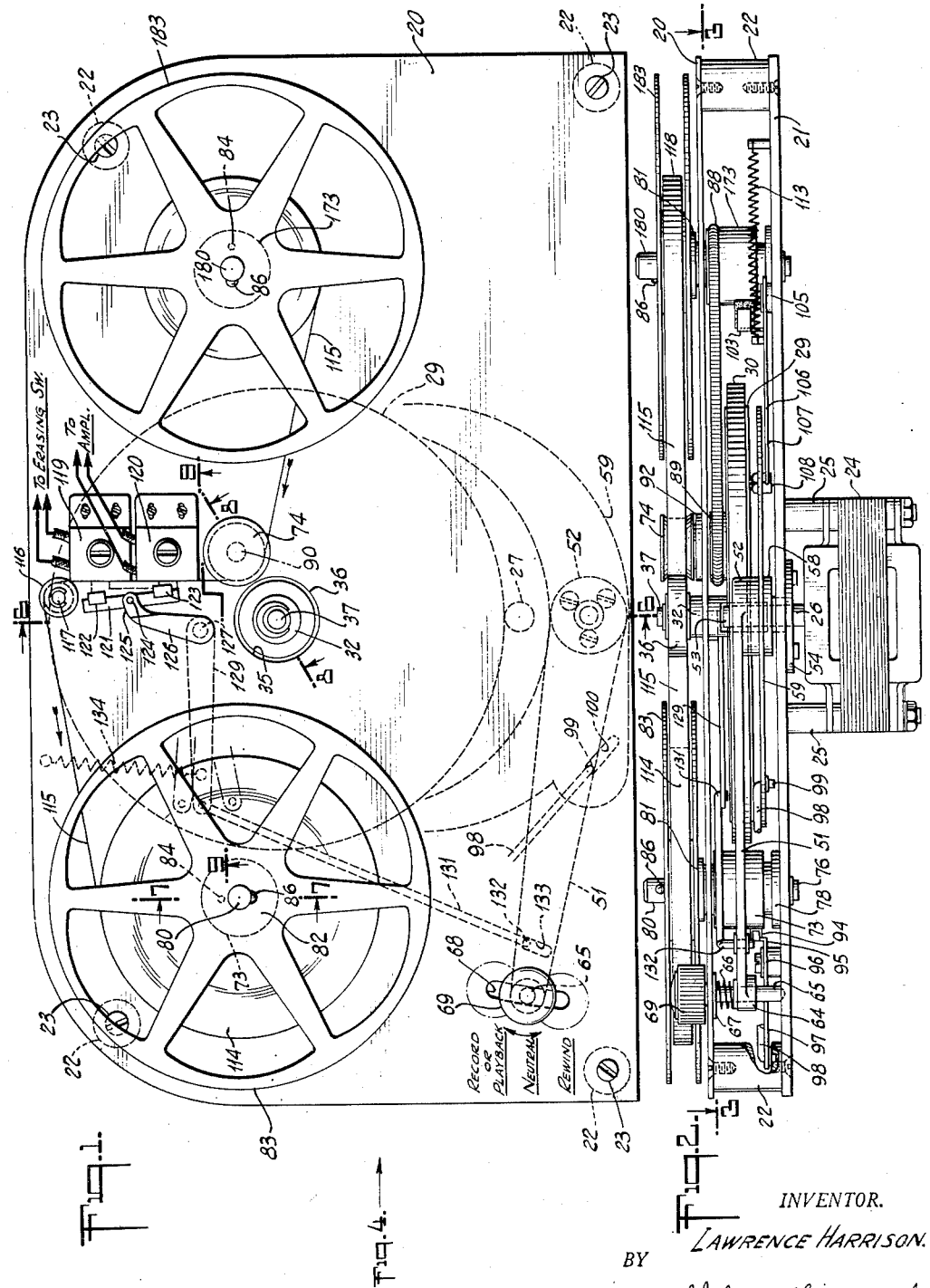
INVENTOR.
LAWRENCE HARRISON.
BY
Watson, Bristol, Johnson & Leavenworth
ATTORNEYS

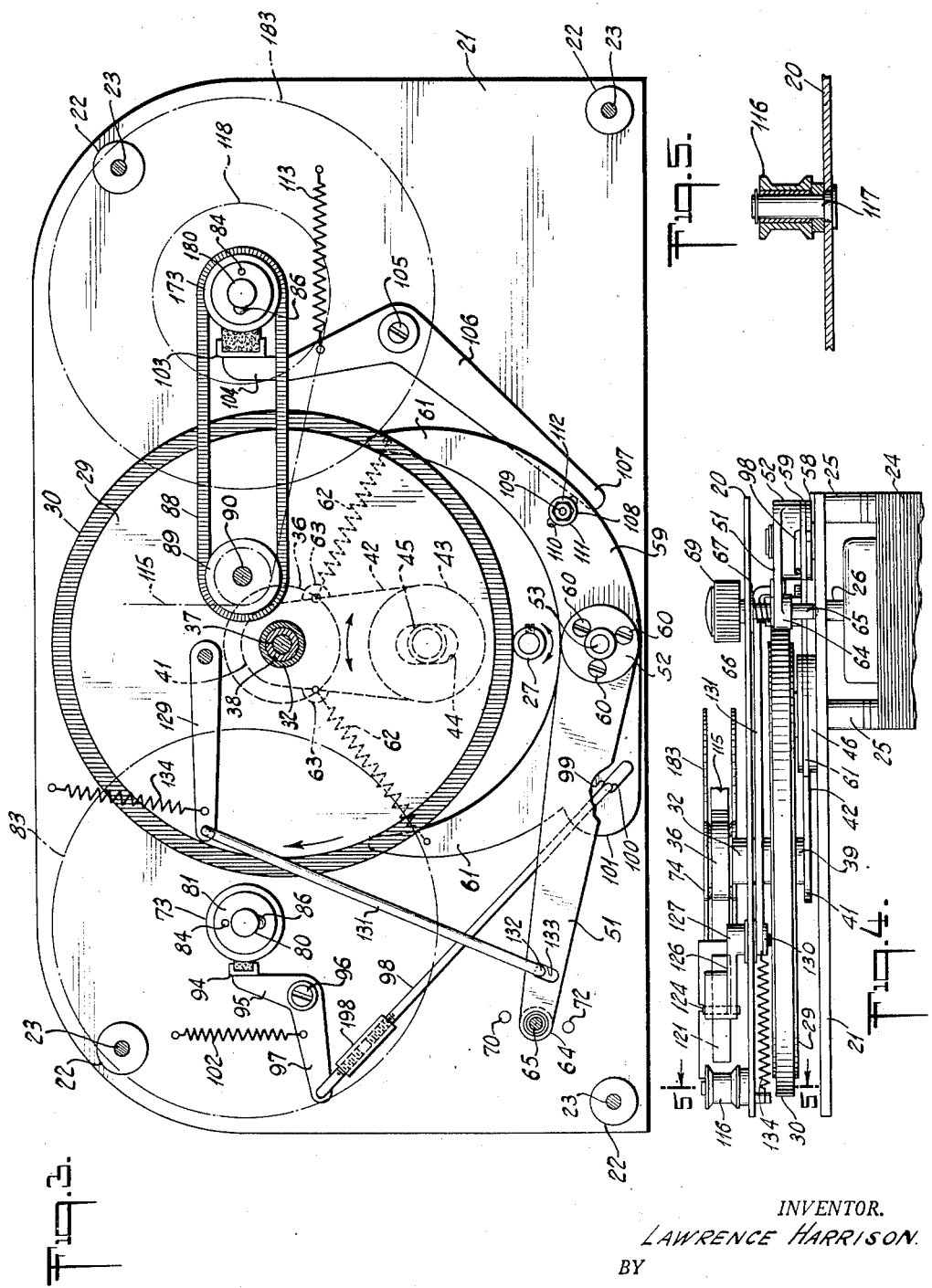

June 5, 1951 L. HARRISON 2,555,643
FRICTION GEARING FOR TELEGRAPHONE MECHANISM
Filed Dec. 11, 1947 5 Sheets-Sheet 3
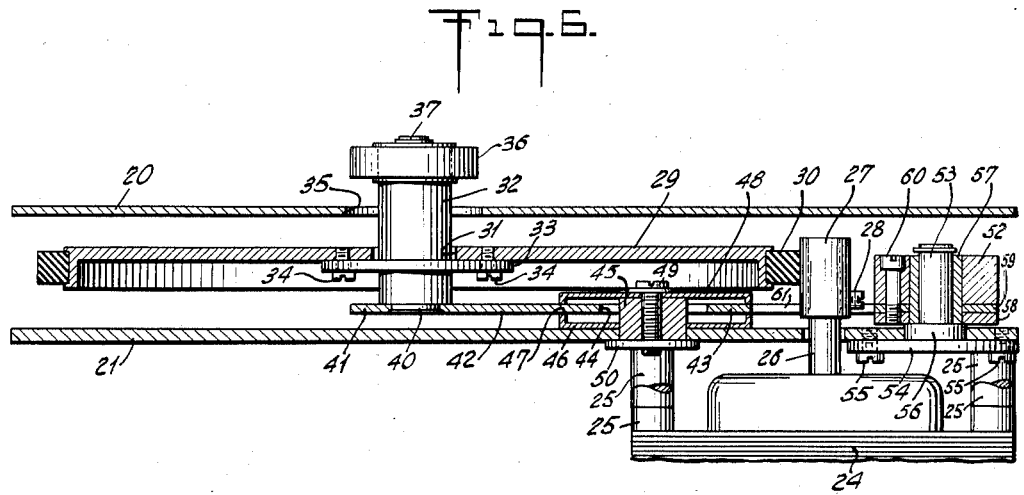
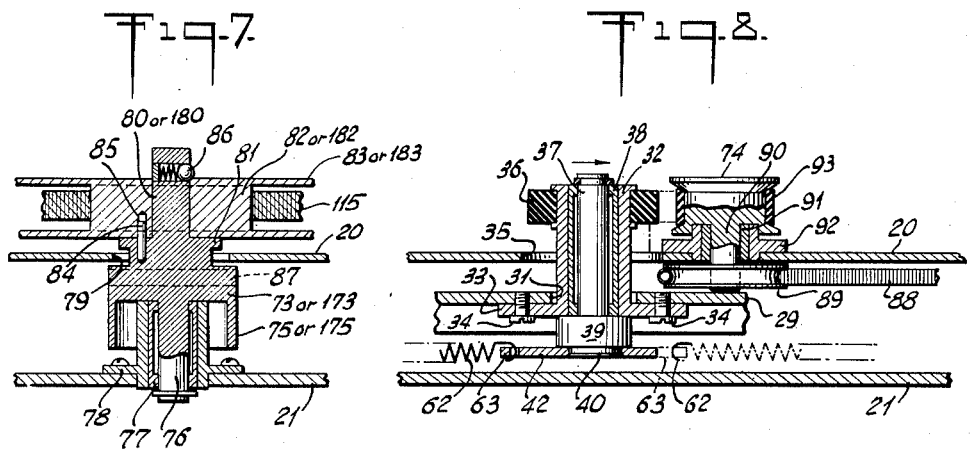
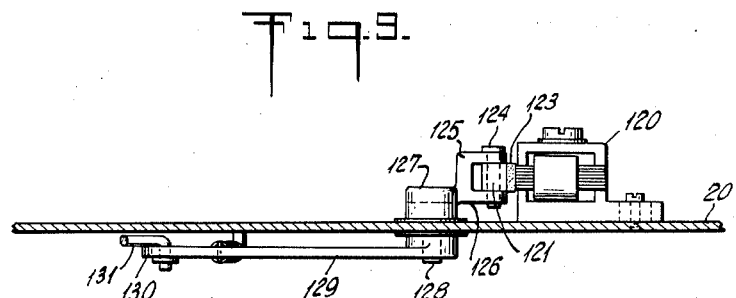
INVENTOR.
LAWRENCE HARRISON.
BY
Watson, Bristol, Johnson & Leavenworth
ATTORNEYS

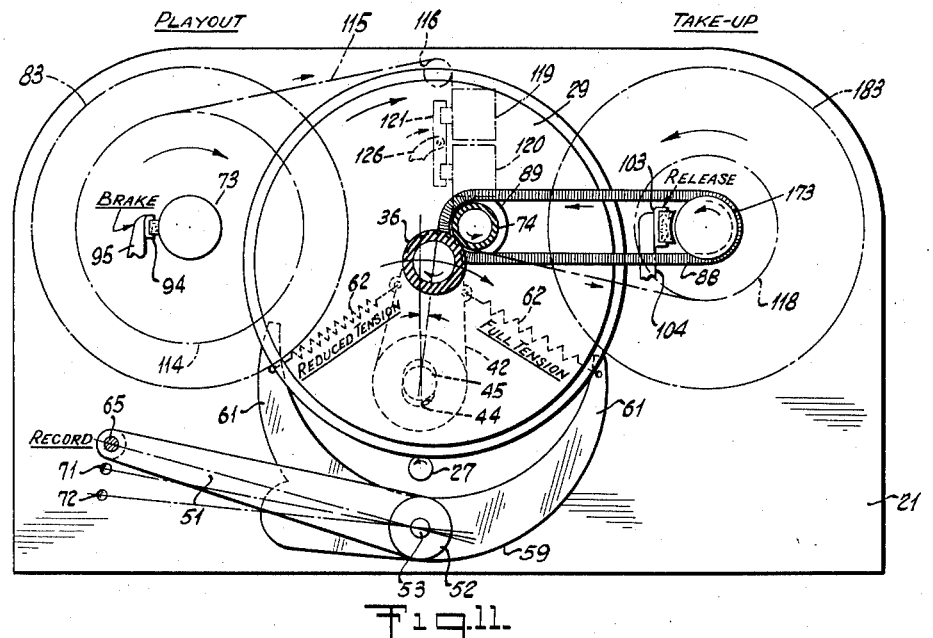
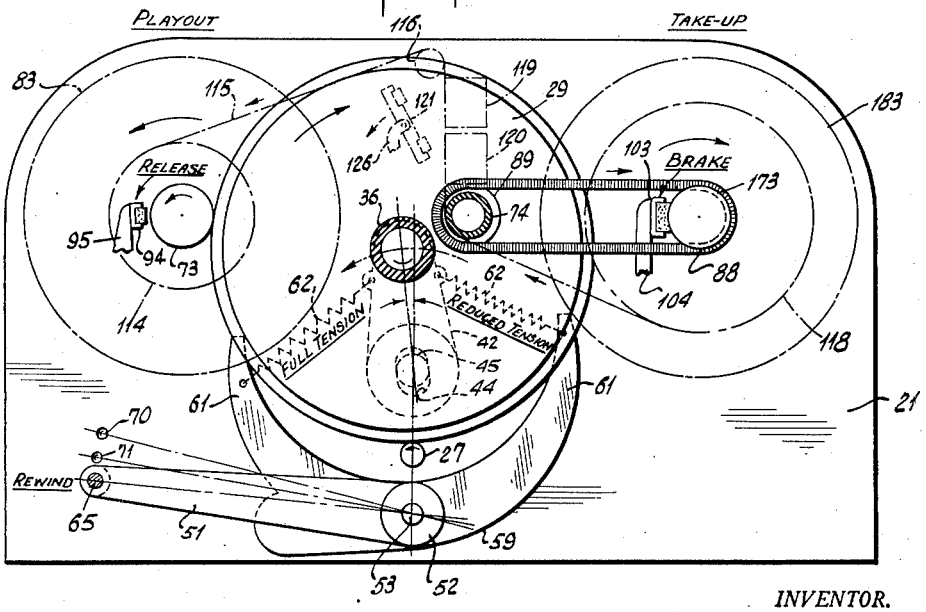

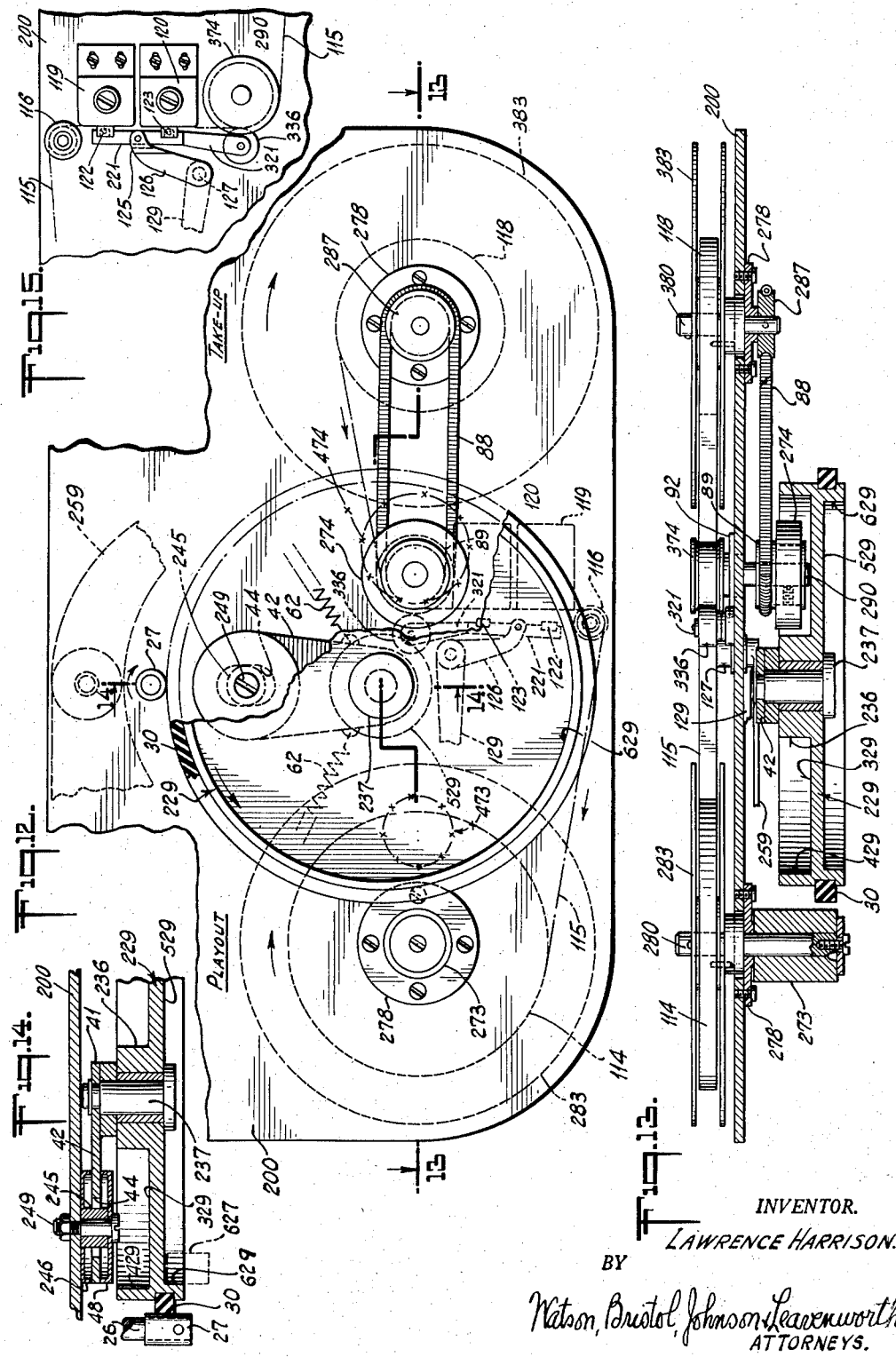

Patented June 5, 1951

2,555,643

UNITED STATES PATENT OFFICE 2,555,643

FRICTION GEARING FOR TELEGRAPHONE MECHANISM

Lawrence Harrison, New York, N. Y.

Application December 11, 1947, Serial No. 791,038

27 Claims. (Cl. 242—55)

The present invention relates to friction gearing and related assemblies which are associable in telegraphones for which they are particularly designed but which may be used to advantage in other apparatus.

A general object of the present invention is to provide such friction gearing and associated structure which is simple and readily and economically constructed and assembled in mass production and which, when employed in telegraphones, permits unusual simplification of the latter while assuring efficient operation with a desired fidelity of recording and reproduction.

A more specific object of the invention is to provide friction gearing which permits efficient alternate drive of a plurality of driven friction wheels from a driving friction wheel when shifted back and forth with the latter being floatingly mounted to assure efficient driving contact with such shifting despite a possible wide variation in dimensions of parts which may result from simple manufacturing procedure in which only large or even no tolerances are dictated.

Another object of the present invention is to provide in such friction gearing mounting means for a friction driving wheel which will permit self-adjusting motion of the latter in a plurality of directions when shifted to driving positions so that it may be effectively biased to secure driving contact of driven friction wheel means.

A further object of the invention is to provide such friction gearing in a telegraphone so associated with other mechanism as to assure positive drive at a constant speed of a reeled string element, such as a magnetic wire or tape, by means of the friction gearing, with suitable means being associated therewith for drive of a take-up reel with effective provision for gradually decreasing speed of the reel to accommodate progressive increase of the diameter of the reeled body of the string element.

An additional object of the invention is to provide suitable braking means in association with such friction gearing as to assure efficient application of brake drag to any certain driven friction wheel means when not being positively driven, such braking means being so designed as to be automatically operable by means of a manual control for shifting a driving friction wheel means alternately to driving contact of a plurality of the driven friction wheel means and permitting, if desired, application of all brakes when the control positions the driving wheel means in a neutral, non-driving location.

A still further object of the invention is to provide, in such mechanism for positive drive of a reeled string element by such friction gearing, a mechanical biasing means which holds the string element against its drive when reeled from a supply reel to a take-up reel but which is so associated with a manual control for the apparatus as automatically to disable the biasing means when the string element is reeled back to the supply reel.

Still another object of the invention is to provide in such friction gearing driving wheel means so equipped with internal drive track means as to assure compactness of mechanism.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

Fig. 1 is a top plan view of a telegraphone apparatus embodying features of the present invention;

Fig. 2 is a side elevational view, with parts broken away, of the apparatus shown in Fig. 1;

Fig. 3 is a sectional view taken substantially on line 3—3 of Fig. 2, with supply and take-up reels and string element indicated in dot-dash lines;

Fig. 4 is an end elevational view of the apparatus shown in Fig. 1 as viewed from the left thereof and with parts broken away;

Fig. 5 is an elevational sectional detail, to an enlarged scale, showing a tape-guiding pulley of the apparatus shown in Fig. 4 and taken substantially on line 5—5 thereof;

Fig. 6 is an enlarged sectional view taken substantially on line 6—6 of Fig. 1, and with parts broken away;

Fig. 7 is an enlarged sectional view taken substantially on line 7—7 of Fig. 1, and with parts broken away;

Fig. 8 is an enlarged sectional view taken substantially on line 8—8 of Fig. 1, and with parts broken away;

Fig. 9 is an enlarged sectional view taken substantially on line 9—9 of Fig. 1, and with parts broken away;

Fig. 10 is a diagrammatic view, somewhat similar to Fig. 3 but to a reduced scale, showing positions of parts during reeling of tape from the supply reel to the take-up reel;

Fig. 11 is a view similar to Fig. 10 showing parts in position for reverse reeling of the tape from the take-up reel back to the supply reel;

Fig. 12 is a bottom plan view, with parts broken away, of a modified form of the apparatus shown in Figs. 1 to 11 inclusive, and featured by a single frame plate and a recessed driving friction wheel;

Fig. 13 is an elevational section taken substantially on line 13—13 of Fig. 12, with parts broken away;

Fig. 14 is an elevational section, with parts broken away, taken substantially on line 14—14 of Fig. 12; and Fig. 15 is a top plan view, with parts broken away, of a detail of the structure shown in Figs. 12 and 13.

Referring to the drawings, similar numerals identify like parts throughout, and, as will be seen from Figs. 1-11 inclusive, one embodiment of telegraphone apparatus, in which is incorporated certain forms of mechanism of the present invention, comprises a top plate 20 and a bottom plate 21 spaced apart by posts 22—22 secured respectively to the top and bottom plates by any suitable means such as stud bolts or screws 23—23. The bottom plate 21 preferably supports in any suitable manner a power source, such as an electric motor 24 which may be suspended by posts 25—25 fastened to the bottom plate. The rotor of the motor 24 carries a drive shaft 26 which, as will be seen more clearly from Fig. 6, extends up through a hole in the bottom plate 21 and carries on its upper end, below top plate 20, a drive roller 27 fixed thereto by any suitable means, such as set screw 28.

A friction gearing assembly is preferably located between the top and bottom plates 20 and 21 and may be mounted upon the latter, at least in part. As shown in Figs. 1-11 inclusive, such friction gearing assembly may comprise a relatively large driving friction wheel means or roller 29, preferably carrying circumferentially thereof a rubber tire 30 adapted to be at all times in driving contact with the drive roller 27. The driving friction wheel 29 is preferably provided with a central hole 31 which, as seen in Figs. 6 and 8, receives therethrough a spool 32 having a bottom flange 33 upon which rests the central portion of the friction wheel fastened thereto by any suitable means, such as screws 34—34. The spool 32 also extends up through an enlarged hole 35 in the top plate 20 and carries on its upper end a driving roller or capstan 36, preferably formed of rubber or the like. The spool 32 is rotatably supported upon a stub shaft 37 preferably with a bearing 38 interposed therebetween and with the bottom flange 33 resting upon a shoulder provided by a shaft flange or collar 39, with a headed end 40 of the shaft fixed in a hole in the free end 41 of a supporting lever arm 42.

The driving friction wheel or roller 29 is, in accordance with the present invention, floatingly mounted for self-adjusting movement and in plurality of directions in a plane substantially normal to its axis. For this purpose, the lever arm 42 has its mounted end 43 provided with a longitudinally-extending slot 44 which loosely receives therethrough a post 45, as is more clearly shown in Fig. 6, for both relative pivotal and longitudinal movement of the mounting lever. The post 45 preferably has one end seated in a hole in bottom plate 21 and carries a cup-shaped flange 46 which provides a narrow concentric bearing surface at 46 upon which mounted end 43 of the lever 42 seats. Another cup-shaped bearing 48 is mounted on the top end of post 45 and the whole mounting lever assembly is secured to the bottom plate 21 by means of a bolt 49 and a nut plate 50.

The employment of the cup-shaped bearing flange 46 and bearing unit 48 gives secure support to the mounted end 43 of lever 42 while minimizing frictional wear. It will thus be seen that the lever arm 42 may be pivoted around fixed post 45, and that the slot 44 permits some longitudinal movement of the lever so that the driving friction wheel 29 may be swung back and forth through an arc and may also be moved closer to or farther away from the mounting point which coincides with the axis of post 45, as will be more fully explained hereinafter.

The apparatus of Figs. 1-11 inclusive, is provided with a manual control which, as seen from Figs. 1, 3, 10 and 11, may comprise a control lever 51 having a hub 52 rotatably mounted upon a post 53 fixed to bottom plate 21. As shown in Fig. 6, the post 53 may have a head plate 54 fixed by screws 55 to the underside of bottom plate 21, and with an enlarged portion 56 seated in and extending through a hole in the bottom plate. The enlarged portion 56 of post 53 provides a top shoulder against which may be seated a bearing 57 and a bottom plate 58. The bottom plate 58 and the lever hub 52 have interposed therebetween an apertured mid-portion of a yoke 59 and the lever hub, bottom plate and yoke may be secured together by any suitable means, such as stud bolts 60—60.

The yoke 59 has a pair of laterally-spaced arms 61, 61, which are arranged on opposite sides of the floatingly-mounted mounting lever 42. Each yoke arm 61 is connected by means of a helical biasing spring 62 to an ear 63 on a side of the mounting lever 42, as will be seen from Figs. 3 and 8. Thus, when the control lever 51 is swung back and forth, the yoke 59 is rocked or pivoted about the post 53 so as, by means of springs 62, 62, to shift or swing the mounting lever 42 back and forth with a pivoting about post 45. As a consequence, driving friction wheel 29 will be shifted back and forth, moving generally in an arc, with the springs 62, 62 biasing its tire 30 against the drive roller 27 for secure and efficient driving contact therewith at all times, and with its springs also tending to bias the driving wheel or roller alternately toward drive contact with driven rollers, as will be more fully explained hereinafter.

The free end of the manual control lever 51 is, as best seen from Figs. 2 and 4, provided with an apertured boss 64 through which is slidably mounted a detent pin 65. The detent pin 65 is biased by a helical spring 66 interposed between the boss 64 and a washer 67 which is in face engagement with the underside of top plate 20. Detent pin 65 extends up through an elongated slot 68 in top plate 20, and is fitted above the latter with a control knob 69, as is indicated in Fig. 1. As shown in Figs. 3, 10 and 11, and as is indicated in Figs. 2 and 4, the rounded bottom end of detent pin 65 is adapted selectively to be indexed or seated into one of a series of three notches or indentations 70, 71 and 72 to determine three positions of the manual control lever 51. The indentation 70 predetermines a "record" or "play-back" position; the intermediate indentation 71 predetermines a "neutral" position, and the indentation 72 predetermines a "re-wind" position of the control lever 51 and associated parts. A slight upward pull on the control knob 69 will overcome the biasing force of the spring 66 and disengage the detent pin 65 from any one of those three indentations so that it may be moved to engagement in any of the others with swing of the control lever 51.

The friction gearing of the embodiment shown in Figs. 1-11 inclusive, also includes two driven friction wheel means or rollers 73 and 74. The driven friction roller 73, as is best shown in Figs. 3 and 7, comprises a circumferential track 75 provided by a circular flange on a shaft 76, with the latter rotatably mounted by means of a bearing 77 supported by a spool 78 fixed upon bottom plate 21. The shaft 76 extends up through a hole 79 in top plate 20 and carries thereabove a stub end or spindle 80 having a reel-supporting or abutment flange 81. The spindle 80 is adapted to be slidably received through apertured hub 82 of a supply reel 83, and abutment flange 81 carries a pin 84 which is adapted to be received in any one of a number of holes 85 in the reel hub. A spring-biased detent 86 is adapted to engage beyond the top side of reel hub 82 when the latter is securely seated against the abutment flange 81, with the pin 84 causing the reel 83 to be driven with the shaft 76. As is more fully explained later, the roller 73 also serves as a brake drum.

A take-up reel 183 is similar to supply reel 83, having a hub 182 supported on a spindle 180 which forms a part of a shaft similar to shaft 76 in construction and support, as is indicated in Fig. 7. In this case, however, circular flange 173 provides a circumferential brake drum surface 175, and in that surface is formed a peripheral groove, indicated in dotted lines at 87, to receive an endless belt 88 (see Fig. 8), which is lapped thereabout for drive from a pulley 89. The endless belt 88 is preferably of the well-known helical spring type, with the drum 175 being preferably formed of steel and the drive pulley 89 being of certain other material, such as hard fiber, that will assure less tendency for belt slippage at the drive pulley 89 than at the steel drum 175. Drive pulley 89 is supported below top plate 20 from the bottom end of a shaft 90 which is rotatably supported by a bearing 91 carried by a sleeve 92 fixed in a hole in top plate 20. The top end of shaft 90 carries driven friction wheel means or roller 74, which, as shown in Fig. 8, is in the form of a pulley preferably provided with a surfacing band 93 of rubber, positioned in apposition to driving capstan 36, to be driven thereby with the magnetic tape interposed therebetween, as is more fully explained hereinafter.

The driven wheel means or roller 73 has associated therewith a brake shoe 93, with the former serving as a brake drum as previously mentioned. The brake shoe 94 is mounted on one arm 95 of a bell crank lever pivotally supported at 96 upon bottom plate 21. The other arm 97 of that bell crank lever is linked by a rod 98 (preferably including a length adjusting turnbuckle 198) to the manual control comprising control lever 51, as is best seen in Fig. 3. For this purpose, as will be seen from Figs. 2 and 3, one end of link rod 98 is turned at right angles to provide a hook 99 which is seated in an elongated slot 100 formed in an ear 101 made integral with yoke 59. A helical spring 102 has one end fastened to bell crank arm 97, and the other end fastened to bottom plate 21, as shown in Fig. 3, to bias the brake shoe 94 toward drag-applying position with respect to brake drum 73.

Also, as previously indicated, flange 173 serves as a brake drum, and, as shown in Figs. 2 and 3, a brake shoe 103 is provided for cooperation therewith. Brake shoe 103 is mounted upon one arm 104 of another bell crank lever pivotally supported at 105 on bottom plate 21. The other arm 106 of the second bell crank lever extends down toward the pivotal support of yoke 59, with its end 107 arranged on the outside of an operating pin 108 mounted to extend down from the yoke 59. Preferably the operating pin 108 is secured to the yoke 59 by adjustment-permitting means, such as a threaded end 109 extended up through an elongated slot 110 in the yoke threadedly to receive above the latter a washer 111 and securing nut 112, so that the position of the operating pin may be suitably adjusted during assembly of parts. A biasing helical spring 113 has one end fixed to bell crank lever arm 104, and the other end fixed to bottom plate 21 to bias brake shoe 103 toward brake drum 173.

In the telegraphone, shown by way of example in Figs. 1-11 inclusive, the supply reel 83 is adapted to be provided with a spirally wound supply or reeled body 114 of string element 115. Preferably the string element 115 comprises a magnetic tape, which may be of known construction and which as best shown in Figs. 1, 10 and 11, is trained from the supply or reeled body 114 on supply reel 83 over to a guide pulley 116 about which it is lapped. As indicated in Fig. 5, guide pulley 116 is rotatably supported by a stub shaft 117 on top plate 20. Tape 115 is then trained from guide pulley 116 down and about one side of driven roller or pulley 74, and finally over to take-up reel 183 for confluent winding thereon as indicated at 118. The run of magnetic tape 115 which extends between idle guide pulley 116 and driven pulley 74 passes progressively down adjacent the faces of a magnetic erasing head 119 and a magnetic recording or play-back head 120, each of suitable construction to serve their respective intended purposes. Since the construction of the erasing head 119 and the recording and play-back head 120 form no part of the present invention and various suitable types thereof are well known in the telegraphone art, no further description thereof is here necessary.

Each of the magnetic heads 119 and 120 are suitably fixed to the top plate 20, with their active faces arranged along the path described by the run of magnetic tape 115 which extends between the pulleys 116 and 74. However, in accordance with one phase of the present invention, it is desired to guide the running tape in its path or bias it closely adjacent the active faces of the magnetic heads 119 and 120 by suitable means which is automatically operable in such manner as to be moved to guiding position during reeling of the magnetic tape 115 from supply reel 83 to take-up reel 183 and to be moved back out of biasing or tape-guiding position at all other times, more particularly during re-winding of the tape back from the take-up reel to the supply reel. In accordance with the embodiment of the invention shown in Figs. 1-11 inclusive, this tape-guiding or biasing means preferably comprises a pivoted slap bar 121, which carries at opposite ends thereof on its face opposed to the tape 115, suitable tape-engaging elements 122 and 123. The tape-engaging elements 122 and 123 may comprise blocks of felt, and, if desired, element 123, which is opposed to recording and play-back head 120, may be provided in the form of a roller.

The slap bar 121 is pivotally supported at 124 by the forked end 125 of a lever arm 126, as best shown in Fig. 9. The lever arm 126 is fixed at 127 to a suitable shaft 128 which extends down through a hole in top plate 20 and is suitably pivotally supported therein. On the bottom end of stub shaft 128, below the top plate 20, is fixed one end of a lever arm 129, having its free end 130 pivotally connected to one end of a disabling link rod 131. The other end, 132, of link rod 131 is turned at right angles to provide a hook received in an elongated slot 133 in control lever 51, as will be seen from Figs. 1, 2 and 3. A helical spring 134 has one end anchored to the underside of top plate 20, and the other end anchored to lever arm 129, as shown in Figs. 3 and 4 to bias the slap bar 121 toward its tape-biasing position, and move it thereto when no pull is applied to disabling rod 131.

To operate the embodiment of the telegraphone shown in Figs. 1 to 11 inclusive, the end of magnetic tape 115 will be drawn off from the wound body 114 thereof on supply reel 83, and will be trained over idle pulley 116, then down past magnetic heads 119 and 120, beneath pulley 74, and finally over to the take-up reel 183, with a few convolutions thereof being wound on the latter in the counter-clockwise direction. This training of the tape 115, of course, will be accomplished with the various parts of the apparatus in neutral positions, such as is proposed in Fig. 3. With operation of the motor, its drive roller 27 will rotate the driving friction wheel 29 by contact with tire 30 of the latter. The size and mass of that driving friction wheel is such that it serves as a fly wheel to assure substantial uniformity in operation of parts, and speed of tape during recording or play back.

If, then, the control lever 51 be shifted to the "record" position with its detent 65 engaged in notch 70, rocking of yoke 59 will swing mounting lever 42 to the right, as viewed in Fig. 3 and to the position shown in Fig. 10, by virtue of increased tension applied to biasing spring 62 on the right side, and a reduction of the tension of biasing spring 62 on the left side. This clockwise swing of driving friction wheel 29 will cause the driving capstan or roller 36, which is arranged coaxially with and fixed to the main driving friction wheel, over to pinch the tape 115 between it and fixed-axis guide pulley or roller 74. The floating mount of the friction driving wheel 29 and its driving capstan 36 will permit the latter automatically to adjust itself to firm driving contact of the tape 115 and, through the latter, to driving relation to the pulley 74. With secure driving contact being maintained between motor drive roller 27 and tire 30 of the driving friction fly wheel 29, the resulting drive of pulley 74 will cause fiber belt pulley 89 to be rotated therewith since they are fixed on the same shaft. Belt 88 will then drive drum 173, which, in turn, will rotate spindle 180 to rotate therewith take-up reel 183 in a counter-clockwise direction, as shown in Fig. 10, for reel-up thereon of the tape.

This upward swing of control lever 51 to the "record" or "play-back" position with attendant clockwise rocking of yoke 59 will remove the pull on link rod 98, permitting spring 102 to bias brake shoe 94 against roller 73, which also serves as a brake drum for the supply reel 83. This will induce drag on the supply reel 83, thereby keeping the trained tape 115 in tension as it is driven forward between capstan 36 and pulley 74. At the same time, the pin 108 will be pushed against brake arm 106 to swing brake shoe 103 away from brake drum 173 of take-up reel 183, so that the latter can be freely driven for reeling thereon the tape as it is fed forward. Since the diameter of pulleys 74, 89 and that provided by the top of drum 173 are substantially equal, it will be understood that as the first few turns of the tape are being reeled up on take-up reel 183, the latter will be rotated at a speed substantially equal to that of the tape-driving pulley 74. However, as additional convolutions of the tape are laid down upon the take-up reel 183, the wound body 118 thereof will gradually be increased in diameter, which will require a gradual slowing down of the speed of rotation of the take-up reel to avoid undue tension being applied to the tape between the latter and the tape-guiding pulley 74. This is automatically permitted by virtue of the fact that the belt pulley 89 is preferably made of fiber, and the drum 173 is preferably made of steel. Slippage of the belt 88 relative to the drum 173 will thus be permitted, with simultaneous application of driving force thereto of a limited degree.

With this upward swing of control lever 51 to the "record" or "play-back" position, pull on rod 131 is relieved so that biasing spring 134 will swing lever arm 129 upwardly, as viewed in Fig. 3. This causes lever arm 126, pivotally carrying slap bar 121, to be swung clockwise, as viewed in Fig. 1, so that the felt bodies 122 and 123 on the slap bar will move to the right and snug or bias tape 115 against the operative faces of the erasing and magnetic heads 119 and 120. As is well understood in the telegraphone art, the magnetic heads 119 and 120 are to be suitably connected in known manner in circuits of electrical recording and reproducing equipment (not shown since it forms no part of the present invention). However, with energizing of the erasing head, any sounds which had been previously recorded on tape 115 will be wiped or erased therefrom as the tape is moved past the erasing head. Energization of the recording magnetic head 120 will then immediately thereafter permit magnetic recording of sounds upon the erased tape as it moves down past that second head. Then, as in the manner indicated above, the recorded tape will be fed over to be reeled upon the take-up reel 183.

At any time it may be desired to play back any sounds recorded on the tape reeled up on the take-up reel 183, control lever 51 will be swung down through the "neutral" position to the "rewind" position with detent pin 65 engaged into notch 72. This downward swing of control lever 51 rocks yoke 59 counter-clockwise to apply greater tension to the connecting spring 62 on the left, and to relieve some of the tension on connecting spring 62 on the right. As a result, mounting lever 42 will be swung counter-clockwise, as viewed in Fig. 3, to shift driving friction fly wheel 29 to the left to bring its circumferential tire 30 into drive contact of driven roller 73, and simultaneously to move driving capstan 36 away from contact with tape 115 and the position in which it biases that tape against pulley 74. This freeing of the tape also removes driving force from the belt 88 so that take-up reel 183 is now idle. Attendant movement to the left of pin 108 carried by yoke 59 permits biasing spring 113 to engage brake shoe 103 against drum 173 to apply brake drag to take-up reel 183. Simultaneously, pull is applied to link rod 98 so that brake shoe 94 is moved against the biasing force of spring 102 away from roller or drum 73. The constantly rotating driving friction fly wheel 29 will, by contact with roller 73, rapidly rotate supply reel 83 in a counter-clockwise direction, as indicated in Fig. 11. As a result, the tape 115 will be rapidly reeled from take-up reel 183 back to the supply reel 83, and without any interference from slap bar 121, since the downward swing of control lever 51 applies pull on link rod 131 to swing lever arm 129 down against biasing force of spring 132, and thus rotate slap bar lever arm 126 counter-clockwise to the position shown in Fig. 11. It will thus be seen that control lever 51 automatically disables slap bar 121 when the former is swung to either the "neutral" or the "re-wind" positions.

In further operation of the embodiment shown in Figs. 1 to 11 inclusive, if then it be desired to play back or make audible any sounds recorded upon the tape 115 as reeled up into the body 114 on supply reel 83, the erasing head 119 will be suitably disabled by circuit switch manipulation and recording head 120 will be employed to translate the magnetic record on the tape into suitable electrical impulses for further translation into sound in a speaker.

In the embodiment shown in Figs. 12 to 15 inclusive, a top plate 200 is employed in substitution for the top and bottom frame plates 20 and 21 of the embodiment shown in Figs. 1 to 11 inclusive. Frame plate 200 supports all of the equipment of this second embodiment, and thereby construction and production are simplified, making for further economies. As will best be seen from Fig. 13, a supply reel spindle 280 supports a supply reel 283 in any suitable manner to be rotated therewith, and spindle 280 is rotatably supported through the frame plate 200 by any suitable bearing support such, for example, as a bearing plate 278. On the bottom end of spindle 280 is fixedly carried, to rotate therewith, a driven roller 273, which, if desired, may also serve as a brake drum.

Frame plate 200 also rotatably supports take-up reel spindle 380 which carries thereon take-up reel 383, and that spindle is rotatably supported through a hole in frame plate 200 by any suitable means such as another bearing plate 278. The bottom end of spindle 380, below frame plate 200, carries fixed thereto a pulley 287, which, if desired, may be formed of steel.

As in the case of the embodiment shown in Figs. 1 to 11 inclusive, frame plate 200 carries on the top thereof erasing magnetic head 119 and recording and play-back magnetic head 120, and an idle guide pulley 116. In lieu of the idle tape-guiding pulley 74 of the embodiment shown in Figs. 1 to 11 inclusive, frame plate 200 carries a driven tape-guiding pulley 374. The tape 115 is trained from a reeled body 114 thereof on supply reel 283 first over to and about idle guide pulley 116, then past the faces of the magnetic heads 119 and 120, to and about guide pulley 374, and finally to the body of reeled or wound convolutions 118 on take-up reel 383.

Guide pulley 374 is rotatably supported on frame plate 200 by any suitable means, such as spool 92 which rotatably receives therethrough shaft 290 on which that guide pulley is fixed. The bottom end of shaft 290 extends below frame plate 200 and carries thereon belt pulley 89 which is preferably formed of hard fiber so as to tend to confine belt slippage to steel pulley 287. Spring belt 88 is lapped about fiber pulley 89 and steel pulley 287 for drive of the latter from the former. Below fiber pulley 89, shaft 290 carries fixed thereto driven roller 274.

It will be understood that if brakes are to be provided for supply reel 283 and take-up reel 383, driven roller 273 as previously mentioned, may serve as one brake drum, and the second brake drum may be mounted on, as an extension of, the lower end of spindle 380 or formed integral with steel pulley 287. Such brakes may be similar to those employed in the embodiment of Figs. 1 to 11 inclusive, and may be suspended from or mounted on the bottom face of frame plate 200 in a somewhat reversal of the mounting thereof on bottom frame plate 21.

A suitable yoke, similar to 59 of Figs. 1 to 11 inclusive, will be pivotally mounted to the bottom face of frame plate 200 in the position shown by dotted lines 259 in Fig. 12, and it will be understood that the yoke is to be fitted with a suitable control lever similar to control lever 51, which, in turn, may carry a detent and control knob similar to detent 65 and control knob 69. For simplicity, however, a modified form of detent of known construction may be employed which will index into a series of three notches in the bottom face of frame plate 200.

Yoke 259 will be connected in the manner taught in connection with the embodiment shown in Figs. 1 to 11 inclusive, by helical springs 62, 62 to mounting lever 42 which may be pivotally supported to the bottom face of frame plate 200 in a manner somewhat the reverse of the mountation thereof in the first embodiment. As shown in Fig. 14, such mountation may comprise a bolt 249 which secures to the bottom side of frame plate 200 bearing cups 246 and 48, with bearing cup 246 provided with a central post 245 located in slot 44 of mounting lever 42. Free end 41 of mounting lever 42 has rotatably suspended therefrom a headed shaft 237 on which is rotatably supported large driving friction wheel 229. Driving friction wheel 229 may carry on the circumference thereof tire 30 to be held constantly in driving contact with motor drive roller 27. Any suitable electrical motor (not shown) for rotating roller 27 may be suspended in any desired manner from the bottom side of frame plate 200.

As will be seen from Figs. 12, 13, and 14, the large driving friction wheel 229 is cupped or recessed on its top side to provide an annular recess or groove 329 forming a circular flange having an inner annular or cylindrical friction drive track 429, and also, if desired, a second annular or cylindrical friction drive track 236 on the hub of the wheel. As will be seen from Fig. 13, the annular groove or recess 329 receives driven roller 274 for cooperation with the hub friction drive track 236, thereby making the construction desirably and unusually compact.

The driving friction wheel 229 may, as proposed in Figs. 13 and 14, be also dished on the bottom side thereof to provide a cup 529 having an inner annular or cylindrical surface 629 which may also serve as a friction drive track. For example, the cylindrical drive track 629 may be in continuous contact with motor drive roller 27 if the latter be positioned at the dotted line position 627 indicated in Fig. 14. In such case, with the other parts remaining substantially the same as to construction and arrangement, it will be desirable to select a motor which has its rotor designed for rotation in a direction opposite that employed in the preceding arrangements. As is well known, there are available on the market motors the rotors of some of which rotate in a clockwise direction, and others the rotors of which rotate in a counter-clockwise direction. Obviously, such properly selected motor can be supported in any suitable manner, such as by means of a suitable hanger suspended from the bottom side of frame plate 200.

As shown in Fig. 15, in the embodiment of Figs. 12 to 15 inclusive, a slap bar 221, similar to slap bar 121 of the first modification, is employed, which is pivotally mounted on lever arm 126. The latter is pivotally mounted through a hole in frame plate 200 at 127, and operated by means of lever arm 129 located below the frame plate. However, since guide pulley 374 is directly driven by shaft 290 from driven friction roller 274 for direct drive of the tape 115, it is desired to employ suitable biasing means to hold the tape against that tape-driving guide pulley during recording and play-back. For this purpose, slap bar 221 preferably is provided with a forked extension 321. The forked extension 321 pivotally supports a tape-biasing roller 336, which, when the slap bar 221 is moved by lever arm 126 to the tape-biasing position shown in Fig. 15, will snug or bias tape 115 to its driving guide pulley 374. When the control lever is moved to "neutral" position with the parts positioned as shown in Fig. 12 the control lever disables the slap bar 221. Linkage similar to that described in connection with the first embodiment connects the control lever to lever arm 129 so as to swing slap bar 221, its tape-biasing felts 122 and 123, the slap bar extension 321, and the tape-biasing roller 336 all to the dotted line positions shown in Fig. 12, away from the path of the run of tape in front of magnetic heads 119 and 120, for freedom of tape motion.

It will thus be seen from the embodiment shown in Figs. 12 to 15 inclusive, that there is considerable conservation of space and consequential economy in materials, parts and production costs made possible by providing the driving wheel means in the form of a cupped or recessed structure. The cupped driving friction wheel 229 makes possible the formation thereon of inner annular driving surfaces or tracks such as 429 and 629, and also a hub driving surface or track 236. This permits the location within the planular area of driving friction wheel 229 of the driven wheel means or roller 274 and if desired, the motor drive roller as proposed in dotted lines at 627 in Fig. 14.

In operation of the embodiment shown in Figs. 12 to 15 inclusive, with the various parts in their neutral positions as dictated by the control lever with its detent in the "neutral" notch, the motor drive pinion 27 continues to rotate friction drive wheel 229 without driving either of the supply and take-up reels 283 and 383. However, if the control lever is moved to the "record" or "playback" position, the driving friction wheel 229 will be swung by its supporting lever 42 to the right, as viewed in Fig. 12. The floating mount of driving friction wheel 229 permits automatic self-adjustment of drive track 236 thereof to efficient driving contact of driven roller 274 with efficient maintenance of drive contact with motor drive roller 27. In other words, driving friction wheel 229 has its circumferential tire 30 held securely in driving contact with motor driven roller 27 and its hub driving track 236 swung over to secure driving contact with driven roller 274. As a result, driven roller 274 drives shaft 290 to rotate tape-driving pulley 374 and fiber pulley 89. The spring belt 88 consequently will drive steel pulley 287, which, in turn, rotates spindle 380 and take-up reel 383 mounted on the latter.

At the same time, the control lever, through linkage similar to link 131 of the embodiment of Figs. 1 to 11 inclusive, releases lever arm 129 so that its biasing spring will cause slap bar lever 126 to rotate counter-clockwise so as to swing slap bar 221 to the full line position shown in Fig. 15, to bias or snug tape 115 up against the faces of magnetic heads 119 and 120 and also to cause the biasing roller 336 to hold the tape firmly against tape-driving pulley 374. Due to the size of the large friction driving wheel 229 and its mass, a fly-wheel action is assured so as to cause the tape to travel past the magnetic heads at relatively uniform speed.

The take-up reel 383 will wind up thereon the tape as it is delivered from tape-driving pulley 374. As the body 118 of reeled tape on take-up reel 383 gradually increases in diameter, the take-up reel must, of necessity, gradually slow down. This is permitted by means of the spring drive belt 88, which can slip at the steel pulley 287 while assuring effective drive of the take-up reel 383.

Those skilled in the telegraphone art will understand that, during recording, with the employment of suitable electrical equipment and manipulation of circuit switches, the erasing magnetic head 119 wipes off of the magnetic tape 115 any messages which may have been previously recorded thereon, so that as the tape then moves past the recording magnetic head 120, any sounds collected by a microphone or transmitter will cause the latter head to record on the magnetic tape those sounds for subsequent reproduction. In play back, with the recording tape again reeled up on supply reel 283, the parts of the mechanism shown in Figs. 12 to 15 inclusive, are arranged in the positions described in connection with recording operations described above. However, in this operation, the erasing magnetic head 119 is suitably disabled and the magnetic head 120 then serves in the electrical system to translate the record on the tape for reproduction of the recorded sounds from the speaker.

In further operation of the embodiment of Figs. 12 to 15 inclusive, when it is desired to re-wind tape 115 back from take-up reel 383 to supply reel 283 for repeating either the recording or the play-back operations, the control lever will be swung to the "rewind" position, thereby rocking the yoke 259. This will swing the driving friction wheel 229 to the left, as viewed in Fig. 12, to bring its tire 30 into drive contact with driven roller 273, and simultaneously to remove its hub track 236 from drive contact of driven roller 274. As a result, the constantly rotating friction driving wheel 229 will rapidly rotate supply reel 283 in a clockwise direction as viewed in Fig. 12 so as to re-wind thereon tape 115, removing it from take-up reel 383. The necessary reverse rotation of tape-driving pulley 374 is permitted since driven roller 274 is freed from drive contact of any part of friction driving wheel 229. At the same time, the slap bar linkage swings slap bar 221 and tape-biasing roller 336 still farther away from tape 115 than they are in the neutral position shown in Fig. 12.

Due to the fact that the diameters of the drive tracks of friction wheel hub 236 and driven friction roller 274 are substantially equal, speed of forward drive of the tape during recording or play back is relatively slow as desired, and may be of the order of twenty feet per minute (20'/min.). On re-wind, however, relatively rapid reverse motion of the tape is desired so as to minimize delay of succeeding recording or play back. Tape speed on re-wind may be of the order of about sixteen times that of forward drive. This high speed in re-winding is attained by virtue of the fact that the friction driving wheel 229 is many times larger in diameter than the driven friction roller 273.

Compactness permitted by employing as a friction driving wheel a recessed or cupped structure of the type described above in connection with Figs. 12 to 15 inclusive, may be attained to an even greater degree if the common axis of spindle 280, supply reel 283, and driven roller 273 is moved to the right as viewed in Fig. 12 to the position indicated in dash-cross lines at 473; and if the common axis of the tape-driving pulley 374, belt pulley 89 and driven roller 274 is also moved over a short distance to the right to the position indicated in dash-cross lines at 474. With the driven roller 273 at the position 473, and the driven roller 274 at the position 474, they are adapted alternately to be driven from the inner annular driving surface or track 429 identified above. Swing of the friction driving wheel 229 to the left, as viewed in Fig. 12, will bring the driven roller at 474 into driving contact with inner annular track 429. If the driving friction wheel 229 is then rotated clockwise (by employing, for example, a motor which rotates in the opposite direction, or by placing a motor drive roller at the position of 627 suggested in Fig. 14), the tape-driving pulley 374 will be rotated clockwise to pull the tape forward and feed it to the clockwise-rotated take-up reel 383, (considering all these parts in the positions shown in Fig. 12). On reverse swing of the friction driving wheel 229 from the neutral position shown in Fig. 12 to the right, the inner annular track 429 will be brought into drive contact of the other driven roller at the position of 473, so as to rotate supply reel 283 in a clockwise direction to re-wind tape 115 thereon. To assure relatively slow forward feed of the tape by the tape-driving pulley 474 with the driven rollers at the positions 473 and 474, it may be desirable to decrease the diameter of that tape-driving pulley 374, since the driven roller which directly drives it is now being operated by a track of much greater diameter than hub track 236. This decrease in diameter of the tape-driving pulley 374, of course, can readily be adopted since the idle guide pulley 116 and the magnetic heads 119 and 120 can be conveniently located at any suitable positions in the area of the top surface of the frame plate 200 between the supply and take-up reels 283 and 383. Of course, such variation in the locations of those parts and the path of the tape will also dictate re-positioning of slap bar 221 and its operating lever arms 126 and 129. These alterations in positions of parts and perhaps modifications in shapes and dimensions thereof, of course, can readily be performed by a skilled mechanic.

It will thus be seen that the feature of floatably mounting the driving friction wheel so that it will automatically adjust itself to the two points of contact of the motor drive roller and either of the two driven rollers will permit a wide variation in dimensions of parts. Thus, in commercial production, wide tolerances in dimensions are permissible, and it is even possible to make the parts for assembly in mass production without dictation of any tolerances, since variations of the order of as much as one-sixteenth of an inch ($\frac{1}{16}''$) have been found to cause no trouble in operation of the assembled apparatus. Other parts which should be adjusted in assembly can readily be properly positioned by virtue of the fact that provision for adjustments is provided by the constructions disclosed. For example, the turn buckle 198 in pull rod 98 permits adjustment of brake shoe 94 relative to driven roller 73 with regard to its operation by the rocking yoke 59. Further, the position of pin 108 which operates brake shoe 103 may be adjusted by sliding threaded shank 109 in slot 110 formed in yoke 59 to the desired position, and there fixed by tightening nut 112. It will further be noted that any of the embodiments of the invention proposed above are comprised of a relatively few number of parts which can be readily and economically produced in mass production and easily and quickly assembled. It is thus apparent that the objects set forth above and others indicated in the preceding description are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Alternate driving friction gearing comprising, in combination, a pair of laterally-spaced rotatable friction rollers adapted alternately to be driven about fixed axes, a driving friction wheel means having two concentric driving tracks of different diameters with one adapted to be moved to driving contact with one of said friction rollers and the other to be moved to driving contact with the other of said friction rollers, laterally-shiftable mounting means located between said rollers and rotatably supporting said driving friction wheel means, and means to shift said mounting means back and forth alternately to move said driving tracks to driving contact of said friction rollers, said shifting means including a resilient linkage to transmit shifting force to said mounting means with give in at least one of the directions of shift.

2. Alternate driving friction gearing comprising, in combination, a pair of laterally-spaced rotatable friction rollers adapted alternately to be driven about fixed axes, a driving friction wheel means having two concentric driving tracks of different diameters with one adapted to be moved to driving contact with one of said friction rollers and the other to be moved to driving contact with the other of said friction rollers, laterally-shiftable mounting means located between said rollers and rotatably supporting said driving friction wheel means, means floatingly supporting said mounting means for motion of the latter in at least two different directions substantially normal to each other in a plane intersecting the axes of said rollers, shifting means, and resilient means to transmit motion from said shifting means to said mounting means to shift the latter back and forth alternately to move said driving tracks to resiliently-biased, self-adapted driving contact of said friction rollers.

3. Alternate driving friction gearing comprising, in combination, a pair of laterally-spaced rotatable friction rollers adapted alternately to be driven about fixed axes, a driving friction wheel means having two concentric driving tracks of different diameters with one adapted to be moved to driving contact with one of said friction rollers and the other to be moved to driving contact with the other of said friction rollers, laterally-shiftable mounting means located between said rollers and rotatably supporting said driving friction wheel means, means floatingly supporting said mounting means at a point for motion of said mounting means in a plane intersecting said axes along arcuate paths extending between said rollers and radially toward and away from the mounting point, shifting means, and resilient means to transmit motion from said shifting means to said mounting means to shift the latter back and forth alternately to move said driving tracks to resiliently-biased, self-adapted driving contact of said friction rollers.

4. Alternate driving friction gearing comprising, in combination, a pair of laterally-spaced rotatable wheel means adapted alternately to be driven about fixed axes, a driving friction wheel means adapted to be shifted back and forth for alternate driving association with said driven wheel means, a mounting lever located between said pair of driven wheel means in a plane intersecting their axes, means on one end of said lever rotatably supporting said friction wheel means between said driven wheel means with the other end of said lever having a longitudinally-extending slot therein, a fixed mounting pin pivotally received in the lever slot and permitting swinging and longitudinal motion of said lever in the mentioned plane, a pivotally-mounted yoke having a pair of laterally-spaced arms located on opposite sides of said lever, manual shifting means to swing said yoke back and forth, and a pair of tension springs tying said lever to said yoke arms for transmitting pull from the latter to the former and for spring-biasing said friction wheel means alternately to driving association with said driven wheel means.

5. Alternate reel driving mechanism comprising, in combination, a pair of laterally-spaced rotatable reels, a pair of reel driving means each rotatably supporting one of said reels, a pair of laterally-spaced rotatable friction rollers adapted alternately to be driven about fixed axes with one of said rollers being fixedly mounted on one of said reel driving means, slip-belt driving means connecting the other of said rollers to the other of said reel driving means, a driving friction wheel means having two concentric driving tracks of different diameters with one adapted to be moved to driving contact with one of said friction rollers and the other to be moved to driving contact with the other of said friction rollers, laterally-shiftable mounting means located between said rollers and rotatably supporting said driving friction wheel means, and means to shift said mounting means back and forth alternately to move said driving tracks to driving contact of said friction rollers, said shifting means including a resilient linkage to transmit shifting force to said mounting means with give in at least one of the directions of shift.

6. Alternate reel driving mechanism comprising, in combination, a pair of laterally-spaced rotatable reels for winding and unwinding a string element from one to the other, a pair of reel driving means each rotatably supporting one of said reels, a pair of laterally-spaced rotatable friction roller means adapted alternately to be driven about fixed axes with one of said roller means being fixedly mounted on one of said reel driving means, slip-belt driving means connecting the other of said roller means to the other of said reel driving means with the last-mentioned roller means including string guiding means to drive the string element, a driving friction wheel means having two concentric driving tracks of different diameters with one adapted to be moved to driving contact with one of said friction roller means and the other to be moved to driving contact with the other of said friction roller means, laterally-shiftable mounting means located between said pair of roller means and rotatably supporting said driving friction wheel means, and means to shift said mounting means back and forth alternately to move said driving tracks to driving contact of said pair of friction roller means, said shifting means including a resilient linkage to transmit shifting force to said mounting means with give in at least one of the directions of shift.

7. Alternate reel driving mechanism comprising, in combination, a pair of laterally-spaced rotatable reels for winding and unwinding a string element from one to the other, a pair of reel driving means each rotatably supporting one of said reels, a pair of laterally-spaced rotatable friction rollers adapted alternately to be driven about fixed axes with one of said rollers being a reel driving roller fixedly mounted on one of said reel driving means and the other of said rollers constituting a string guiding and driving pulley, slip-belt driving means connecting the pulley roller to the other of said reel driving means, a driving friction wheel means adapted to be moved in one direction to driving contact with said reel driving roller and in the opposite direction to driving contact with said pulley roller and with the string element pinched therebetween, laterally-shiftable mounting means located between said rollers and rotatably supporting said driving friction wheel means, and means to shift said mounting means back and forth alternately to move said driving friction wheel means to driving contact of said friction rollers.

8. Alternate reel driving mechanism comprising, in combination, a pair of laterally-spaced rotatable reels for winding and unwinding a string element from one to the other, a pair of reel driving means each rotatably supporting one of said reels, a pair of laterally-spaced rotatable friction rollers adapted alternately to be driven about fixed axes with one of said rollers being a reel driving roller fixedly mounted on one of said reel driving means and the other of said rollers constituting a string guiding and driving pulley, a belt driving pulley fixed to the pulley roller for rotation therewith, slip-belt driving means lapped about the other of said reel driving means and said belt pulley, a driving friction wheel means having two concentric driving tracks with one adapted to be moved in one direction to driving contact of said reel driving roller and the other adapted to be moved in the opposite direction to driving contact of said pulley roller for drive of the string element therebetween, laterally-shiftable mounting means located between said rollers and rotatably supporting said driving friction wheel means, and means to shift said mounting means back and forth alternately to move said driving friction wheel means to driving contact of said friction rollers.

9. Alternate reel driving mechanism comprising, in combination, a pair of laterally-spaced rotatable reels for winding and unwinding a string element from one to the other, a pair of reel driving means each rotatably supporting one of said reels, a pair of laterally-spaced rotatable friction rollers adapted alternately to be driven about fixed axes with one of said rollers being a reel driving roller fixedly mounted on one of said reel driving means and the other of said rollers constituting a string guiding and driving pulley, a belt driving pulley fixed to the pulley roller for rotation therewith, slip-belt driving means lapped about the other of said reel driving means and said belt pulley, a driving friction wheel means having two concentric driving tracks of different diameters with the larger one adapted to be moved to driving contact of said reel driving roller when said friction wheel means is moved in one direction and with the smaller track being adapted to be moved to driving contact of said pulley roller for drive of the string element therebetween when said friction wheel means is moved in the opposite direction, laterally-shiftable mounting means located between said rollers and rotatably supporting said driving friction wheel means, and means to shift said mounting means back and forth alternately to move said driving friction wheel means in opposite directions for alternate drive of said friction rollers.

10. Alternate reel driving mechanism comprising, in combination, a pair of laterally-spaced rotatable reels for winding and unwinding a string element from one to the other along a defined path, means to operate on the string element located at a point along the defined path, string-biasing means movably mounted in the vicinity of said string operating means to bias the string toward the latter, a pair of reel driving means each rotatably supporting one of said reels, a pair of laterally-spaced rotatable friction roller means adapted alternately to be driven about fixed axes, means connecting one of said roller means to one of said reels and the other of said roller means to the other of said reels for respective alternate drive thereof, a driving friction wheel means adapted to be shifted back and forth for alternate drive of said pair of friction roller means, shiftable mounting means rotatably supporting said driving friction wheel means to move the latter back and forth for alternate driving contact of said pair of friction roller means, and linkage means connecting said mounting means to said string-biasing means to move the latter out of biasing position when said mounting means is shifted in one direction and to biasing position when said mounting means is shifted in the opposite direction.

11. Alternate reel driving mechanism comprising, in combination, a pair of laterally-spaced rotatable reels for winding and unwinding a string element from one to the other along a defined path, means to operate on the string element located at a point along the defined path, string-biasing means movably mounted in the vicinity of said string operating means to bias the string toward the latter, a pair of reel driving means each rotatably supporting one of said reels, a pair of laterally-spaced rotatable friction roller means adapted alternately to be driven about fixed axes, means connecting one of said roller means to one of said reels and the other of said roller means to the other of said reels for respective alternate drive thereof, a driving friction wheel means adapted to be shifted back and forth for alternate drive of said pair of friction roller means, laterally-shiftable mounting means rotatably supporting said driving friction wheel means, a manual lever to shift said mounting means back and forth to move said friction wheel means to alternate driving contact of said pair of roller means, and a linkage connecting said lever to said string-biasing means to move the latter out of biasing position when said mounting means is shifted in one direction and to biasing position when said mounting means is shifted in the opposite direction.

12. Alternate reel driving mechanism comprising, in combination, a pair of laterally-spaced rotatable reels for winding and unwinding a string element from one to the other along a defined path, means to operate on the string element located at a point along the defined path, string-biasing means movably mounted in the vicinity of said string operating means to bias the string toward the latter, a pair of reel driving means each rotatably supporting one of said reels, a pair of laterally-spaced rotatable friction roller means adapted alternately to be driven about fixed axes, means connecting one of said roller means to one of said reels and the other of said roller means to the other of said reels for respective alternate drive thereof, a driving friction wheel means adapted to be shifted back and forth for alternate drive of said pair of friction roller means, laterally-shiftable mounting means rotatably supporting said driving friction wheel means, means floatingly supporting said mounting means for motion about a point in a plane along arcuate paths extending between said pair of roller means and radially toward and away from that point, shifting means including a manual lever, resilient means to transmit motion from said shifting means to said mounting means to move the latter and said driving friction wheel means back and forth for alternate drive of said pair of roller means, and a linkage connecting said shifting means to said string-biasing means to swing the latter back and forth into and out of biasing position.

13. Alternate reel driving mechanism comprising, in combination, a pair of laterally-spaced rotatable reels for winding and unwinding a string element from one to the other, a pair of reel driving friction roller means adapted alternately to be driven about fixed axes, means fixedly connecting one of said roller means directly to one of said reels for rotation therewith, means for driving the other of said reels from the other of said roller means, a string guiding pulley mounted to the last-mentioned roller means for drive of the string element, shiftable means to bias the string element to said guiding pulley when the latter is driven, a driving friction wheel means adapted to be shifted back and forth for alternate drive of said pair of roller means, laterally-shiftable mounting means rotatably supporting said driving friction wheel means, and linkage means connecting said mounting means to said shiftable biasing means to shift the latter to a position biasing the string element against said pulley when the latter is driven by its roller means from said driving friction wheel means and out of that biasing position when the latter is shifted to driving contact of the other roller means.

14. Alternate reel driving mechanism comprising, in combination, a pair of laterally-spaced rotatable reels for winding and unwinding a string element from one to the other, a pair of reel driving friction roller means adapted alternately to be driven about fixed axes, means fixedly connecting one of said roller means directly to one of said reels for rotation therewith, means for driving the other of said reels from the other of said roller means, a string guiding pulley mounted to the last-mentioned roller means for drive of the string element, shiftable means to bias the string element to said guiding pulley when the latter is driven, a driving friction wheel means adapted to be shifted back and forth for alternate drive of said pair of roller means, laterally-shiftable mounting means rotatably supporting said driving friction wheel means, a manual lever to shift said mounting means back and forth to move said friction wheel means to alternate driving contact of said pair of roller means, and a linkage connecting said lever to said shiftable biasing means to shift the latter to a position biasing the string element against said pulley when the latter is driven by its roller means from said driving friction wheel means and out of that biasing position when the latter is shifted to driving contact of the other roller means.

15. Alternate reel driving mechanism comprising, in combination, a pair of laterally-spaced rotatable reels for winding and unwinding a string element from one to the other, a pair of reel driving friction roller means adapted alternately to be driven about fixed axes, means fixedly connecting one of said roller means directly to one of said reels for rotation therewith, means for driving the other of said reels from the other of said roller means, a string guiding pulley mounted to the last-mentioned roller means for drive of the string element, shiftable means to bias the string element to said guiding pulley when the latter is driven, a driving friction wheel means adapted to be shifted back and forth for alternate drive of said pair of roller means, laterally-shiftable mounting means rotatably supporting said driving friction wheel means, means floatingly supporting said mounting means for motion about a point in a plane along arcuate paths extending between said pair of roller means and radially toward and away from that point, shifting means including a manual lever, resilient means to transmit motion from said shifting means to said mounting means to swing the latter and said driving friction wheel means back and forth for alternate drive of said pair of roller means, and a linkage connecting said shifting means to said shiftable biasing means to shift the latter to a position biasing the string element against said pulley when the latter is driven by its roller means from said driving friction wheel means and out of that biasing position when the latter is shifted to driving contact of the other roller means.

16. Alternate reel driving mechanism comprising, in combination, a pair of laterally-spaced rotatable reels for winding and unwinding a string element from one to the other, a pair of reel driving friction roller means adapted alternately to be driven about fixed axes, means fixedly connecting one of said roller means directly to one of said reels for rotation therewith, means for driving the other of said reels from the other of said roller means, a string guiding pulley mounted to the last-mentioned roller means for drive of the string element and to cause the latter to move along a defined path, string conditioning means located at a point along the defined path, shiftable means to bias the string element toward said string conditioning means and to said guiding pulley when the latter is driven, a driving friction wheel means adapted to be shifted back and forth for alternate drive of said pair of roller means, laterally-shiftable mounting means rotatably supporting said driving friction wheel means, and linkage means connecting said mounting means to said shiftable biasing means to shift the latter to a position biasing the string element toward said string conditioning means and against said pulley when the latter is driven by its roller means from said driving friction wheel means and out of that biasing position when the latter is shifted to driving contact of the other roller means.

17. Alternate reel driving mechanism comprising, in combination, a pair of laterally-spaced rotatable reels for winding and unwinding a string element from one to the other, a pair of reel driving friction roller means adapted alternately to be driven about fixed axes, means fixedly connecting one of said roller means directly to one of said reels for rotation therewith, means for driving the other of said reels from the other of said roller means, a string guiding pulley mounted to the last-mentioned roller means for drive of the string element and to cause the latter to move along a defined path, string conditioning means located at a point along the defined path, shiftable means to bias the string element toward said string conditioning means and to said guiding pulley when the latter is driven, a driving friction wheel means adapted to be shifted back and forth for alternate drive of said pair of roller means, laterally-shiftable mounting means rotatably supporting said driving friction wheel means, a manual lever to shift said mounting means back and forth to move said friction wheel means to alternate driving contact of said pair of roller means, and a linkage connecting said lever to said shifting biasing means to shift the latter to a position biasing the string element toward said string conditioning means and against said pulley when the latter is driven by its roller means from said driving friction wheel means and out of that biasing position when the latter is shifted to driving contact of the other roller means.

18. Alternate reel driving mechanism comprising, in combination, a pair of laterally-spaced rotatable reels for winding and unwinding a string element from one to the other, a pair of reel driving friction roller means adapted alternately to be driven about fixed axes, means fixedly connecting one of said roller means directly to one of said reels for rotation therewith, means for driving the other of said reels from the other of said roller means, a string guiding pulley mounted to the last-mentioned roller means for drive of the string element and to cause the latter to move along a defined path, string conditioning means located at a point along the defined path, shiftable means to bias the string element toward said string conditioning means and to said guiding pulley when the latter is driven, a driving friction wheel means adapted to be shifted back and forth for alternate drive of said pair of roller means, laterally-shiftable mounting means rotatably supporting said driving friction wheel means, means floatingly supporting said mounting means for motion about a point in a plane along arcuate paths extending between said pair of roller means and radially toward and away from that point, shifting means including a manual lever, resilient means to transmit motion from said shifting means to said mounting means to swing the latter and said driving friction wheel means back and forth for alternate drive of said pair of roller means, and a linkage connecting said shifting means to said shiftable biasing means to shift the latter to a position biasing the string element toward said string conditioning means and against said pulley when the latter is driven by its roller means from said driving friction wheel means and out of that biasing position when the latter is shifted to driving contact of the other roller means.

19. Alternate reel driving mechanism comprising, in combination, a pair of laterally-spaced rotatable reels for winding and unwinding a string element from one to the other, a pair of driven reel-driving friction wheel means adapted alternately to be driven about fixed axes, means for driving each of said reels from one of said driven wheel means, string guiding means to cause the string element to move along a defined path, string conditioning means located at a point along the defined path, shiftable means to bias the string element toward said string conditioning means, a driving friction wheel means adapted to be shifted back and forth for alternate drive of said pair of driven wheel means, laterally-shiftable mounting means rotatably supporting said driving friction wheel means, and linkage means connecting said mounting means to said shiftable biasing means to shift the latter with the former to a position biasing the string element toward said string conditioning means when one of said driven wheel means is driven from said driving friction wheel means and out of that biasing position when the latter is shifted to position for driving the other driven wheel means.

20. Alternate reel driving mechanism comprising, in combination, a pair of laterally-spaced rotatable reels for winding and unwinding a string element from one to the other, a pair of reel-driving friction rollers adapted alternately to be driven about fixed axes, means for driving each of said reels from one of said rollers, string guiding means to cause the string element to move along a defined path, string conditioning means located at a point along the defined path, shiftable means to bias the string element toward said string conditioning means, a driving friction wheel means adapted to be shifted back and forth for alternate drive of said pair of rollers, laterally-shiftable mounting means rotatably supporting said driving friction wheel means, control means to shift said mounting means back and forth to move said friction wheel means to alternate driving contact of said pair of rollers, and a linkage connecting said lever to said shiftable biasing means to shift the latter to a position biasing the string element toward said string conditioning means when one of said rollers is driven from said driving friction wheel means and out of that biasing position when the latter is shifted by said lever to driving contact of the other of said rollers.

21. Alternate reel driving mechanism comprising, in combination, a pair of laterally-spaced rotatable reels for winding and unwinding a string element from one to the other, a pair of reel-driving friction rollers adapted alternately to be driven about fixed axes, means fixedly connecting one of said rollers directly to one of said reels for rotation therewith, means for driving the other of said reels from the other of said roller means, string guiding means to cause the string element to move along a defined path, string conditioning means located at a point along the defined path, shiftable means to bias the string element toward said string conditioning means, a driving friction wheel means adapted to be shifted back and forth for alternate drive of said pair of rollers, laterally-shiftable mounting means rotatably supporting said driving friction wheel means, means floatingly supporting said mounting means for motion about a point in a plane along arcuate paths extending between said pair of rollers and radially toward and away from that point, shifting means including a manual lever, resilient means to transmit motion from said shifting means to said mounting means to swing the latter and said driving friction wheel means back and forth for alternate drive of said pair of rollers, and a linkage connecting said shifting means to said shiftable biasing means to shift the latter to a position biasing the string element toward said string conditioning means when said roller which is fixed directly to one of said reels is driven by contact with said driving friction wheel means and out of that biasing position when the latter is shifted to driving contact of the other of said rollers.

22. Alternate driving friction gearing comprising, in combination, a power-driven driving roller having a fixed axis, a pair of laterally-spaced rotatable wheel means adapted alternately to be driven about fixed axes, an intermediate driving friction wheel means adapted to be held in constant driving contact with said roller and shifted back and forth for alternate driving association with said driven wheel means, laterally-shiftable mounting means located between said driven wheel means and rotatably supporting said driving friction wheel means, means floatingly supporting said mounting means for motion of the latter in a plane in at least two different directions substantially normal to each other, shifting means alternately to shift said driving wheel means to driving association with said driven wheel means, and resilient means biasing said floating mounting means and said driving wheel means carried thereby toward said roller to maintain proper driving contact between the two latter.

23. The alternate driving friction gearing as defined in claim 22 characterized by provision of said intermediate driving wheel means in a form providing two concentric driving tracks of different diameters with one adapted to be shifted to driving contact with one of said fixed axis driven wheel means and the other to be shifted to driving contact with the other of said fixed axis driven wheel means on alternate shift of said driving wheel means.

24. The alternate driving friction gearing as defined in claim 23 characterized by location of the fixed axis driven wheel means which is contacted by the driving track of larger diameter at a point assuring biasing by said resilient means of that track to driving contact when shifted to the position of the latter.

25. Alternate driving friction gearing comprising, in combination, a power-driven driving roller having a fixed axis, a pair of laterally-spaced rotatable friction rollers adapted alternately to be driven about fixed axes, an intermediate driving friction wheel means adapted to be held in constant driving contact with said roller and moved in one direction to driving contact with one of said friction rollers and in the opposite direction to driving contact with the other of said friction rollers, a mounting lever located between said pair of friction rollers and rotatably supporting said driving friction wheel means on one end thereof, means movably supporting the other end of said lever at a pivot point in the vicinity of said roller for both swinging and longitudinal motion of said lever in a plane intersecting said axes, shifting means to swing said lever back and forth alternately to move said friction wheel means to resiliently-biased driving contact of said friction rollers, with self-adapting longitudinal motion of said lever being permitted, and resilient means longitudinally biasing said lever toward its pivot point to maintain said driving wheel means in proper driving contact with said driving roller.

26. The alternate driving friction gearing as defined in claim 25 characterized by a mounting of said lever by means of a fixed mounting pin pivotally received in a longitudinally-extending slot in the lever to permit both longitudinal and swinging motion thereof with the resilient means biasing the portion of said lever which supports said intermediate driving wheel means toward said pin.

27. The alternate driving friction gearing as defined in claim 26 characterized by provision of said driving wheel means in a form providing two concentric driving tracks of different diameters with one adapted to be swung to driving contact with one of said driven rollers and the other to be swung to driving contact with the other of said driven rollers with back and forth swinging of said wheel means, said resilient means biasing at least one of the tracks to driving contact with one of said driven rollers when swung toward the latter.

LAWRENCE HARRISON.

REFERENCES CITED

The following references are of record in the file of this patent:

UNITED STATES PATENTS

| Number | Name | Date |
|---|---|---|
| 200,715 | Guild | Feb. 26, 1878 |
| 1,789,607 | Steurer | Jan. 20, 1931 |
| 2,019,187 | Kile | Oct. 29, 1935 |
| 2,409,942 | Knapp | Oct. 22, 1946 |
| 2,421,910 | Hartman | June 10, 1947 |
| 2,438,222 | Lear | Mar. 23, 1948 |
| 2,528,061 | Knapp | Oct. 31, 1950 |